US011150936B2

(12) United States Patent
Trabelsi et al.

(10) Patent No.: US 11,150,936 B2
(45) Date of Patent: Oct. 19, 2021

(54) TECHNIQUES FOR BINDING USER IDENTITIES TO APPROPRIATE VIRTUAL MACHINES WITH SINGLE SIGN-ON

(71) Applicant: Hysolate Ltd., Tel Aviv-Jaffa (IL)

(72) Inventors: Tomer Trabelsi, Tel Aviv (IL); Oleg Zlotnik, Nesher (IL); Nir Adler, Netanya (IL); Tai Zamir, Tel Aviv (IL)

(73) Assignee: Hysolate Ltd., Tel Aviv-Jaffa (IL)

( * ) Notice: Subject to any disclaimer, the term of this patent is extended or adjusted under 35 U.S.C. 154(b) by 0 days.

(21) Appl. No.: 16/580,623

(22) Filed: Sep. 24, 2019

(65) Prior Publication Data

US 2020/0019430 A1 Jan. 16, 2020

Related U.S. Application Data

(63) Continuation-in-part of application No. 15/876,654, filed on Jan. 22, 2018, now Pat. No. 10,699,004.

(60) Provisional application No. 62/449,123, filed on Jan. 23, 2017.

(51) Int. Cl.
*G06F 9/455* (2018.01)
*G06F 21/40* (2013.01)
*G06F 21/41* (2013.01)

(52) U.S. Cl.
CPC .......... *G06F 9/45558* (2013.01); *G06F 21/40* (2013.01); *G06F 21/41* (2013.01); *G06F 2009/45587* (2013.01); *G06F 2009/45591* (2013.01)

(58) Field of Classification Search
CPC ...... G06F 9/45558; G06F 21/40; G06F 21/41; G06F 2009/45591; G06F 2009/45587; G06F 9/452

USPC .................................................... 726/1
See application file for complete search history.

(56) References Cited

U.S. PATENT DOCUMENTS

| | | | |
|---|---|---|---|
| 8,141,075 B1 * | 3/2012 | Chawla | G06F 9/45558 718/1 |
| 8,220,047 B1 * | 7/2012 | Soghoian | H04L 51/14 726/22 |
| 8,555,274 B1 * | 10/2013 | Chawla | G06F 9/452 718/1 |
| 8,732,607 B1 * | 5/2014 | Grechishkin | G06F 3/04817 715/781 |
| 8,910,277 B1 | 12/2014 | Reis et al. | |
| 8,924,961 B2 * | 12/2014 | Radhakrishnan | G06F 9/5055 718/1 |
| 8,929,287 B1 * | 1/2015 | Huang | G06F 9/543 370/328 |
| 8,966,004 B2 * | 2/2015 | Connelly | H04L 67/10 709/217 |
| 8,966,581 B1 * | 2/2015 | Gross | G06F 9/45558 726/2 |

(Continued)

*Primary Examiner* — Badri Narayanan Champakesan
(74) *Attorney, Agent, or Firm* — M&B IP Analysts, LLC

(57) ABSTRACT

A method for binding a user account operable on an air-gapped computer to an appropriate virtual machine (VM), comprising: monitoring a plurality of VMs to determine an associated user account for each of the plurality of VMs, wherein the plurality of VMs are executed over the air-gapped computer, and wherein each of the plurality of VMs is a distinct security zone in the air-gapped computer; determining a current VM from the plurality of VMs to bind an associated user account thereto; and displaying user specific indications on desktop items associated with each user account.

21 Claims, 11 Drawing Sheets

(56) References Cited

U.S. PATENT DOCUMENTS

| | | |
|---|---|---|
| 8,972,977 B2 | 3/2015 | Neil |
| 9,116,733 B2* | 8/2015 | Banga .................... G06F 21/53 |
| 9,129,123 B2* | 9/2015 | Mooring ............. G06F 13/1673 |
| 9,148,428 B1* | 9/2015 | Banga ................ H04L 63/1425 |
| 9,210,213 B2* | 12/2015 | Momchilov ............ H04L 67/08 |
| 9,218,489 B2* | 12/2015 | Mooring ............. G06F 9/45558 |
| 9,384,029 B1* | 7/2016 | Brandwine ......... G06F 9/45558 |
| 9,386,021 B1* | 7/2016 | Pratt .................... G06F 9/45558 |
| 9,417,904 B2* | 8/2016 | Shin .................... G06F 9/45558 |
| 9,495,215 B2* | 11/2016 | Podvratnik ............... G06F 8/61 |
| 9,565,202 B1* | 2/2017 | Kindlund ............. G06F 21/567 |
| 9,600,312 B2* | 3/2017 | Wagner ............... G06F 9/45558 |
| 9,781,055 B2 | 10/2017 | Liu et al. |
| 9,792,143 B1* | 10/2017 | Potlapally ........... G06F 21/6218 |
| 9,832,024 B2 | 11/2017 | Xu et al. |
| 10,055,144 B1* | 8/2018 | Panchapakesan ....... G06F 3/068 |
| 10,135,842 B2* | 11/2018 | Moshchuk ............. G06F 21/60 |
| 10,171,508 B2* | 1/2019 | Ylonen .................... H04L 9/083 |
| 10,469,472 B2* | 11/2019 | Main ......................... G06F 8/61 |
| 10,795,707 B2* | 10/2020 | Hay ...................... G06F 21/566 |
| 10,922,423 B1* | 2/2021 | Rungta ................. G06F 21/577 |
| 2007/0288247 A1* | 12/2007 | Mackay ................ G06F 16/113 705/1.1 |
| 2008/0228865 A1* | 9/2008 | Cruzada ................. H04L 67/10 709/203 |
| 2008/0229227 A1 | 9/2008 | Bantz et al. |
| 2011/0265168 A1* | 10/2011 | Lucovsky ........... H04L 41/0893 726/7 |
| 2012/0054396 A1* | 3/2012 | Bhattacharya ........ G06F 13/385 710/300 |
| 2012/0089980 A1* | 4/2012 | Sharp ................... G06F 9/45558 718/1 |
| 2014/0351810 A1* | 11/2014 | Pratt .................... G06F 9/45545 718/1 |
| 2016/0021149 A1* | 1/2016 | Maistri .................... H04L 65/80 348/14.08 |
| 2016/0335110 A1* | 11/2016 | Paithane ................. G06F 21/53 |
| 2017/0048249 A1* | 2/2017 | Berrange ............. H04L 63/102 |
| 2017/0118247 A1* | 4/2017 | Hussain .................... G06F 21/62 |
| 2018/0046479 A1* | 2/2018 | Ghosh .................... G06F 21/53 |
| 2018/0062929 A1 | 3/2018 | Maskalik et al. |
| 2018/0359799 A1* | 12/2018 | Huang ................. H04W 24/02 |
| 2019/0109768 A1* | 4/2019 | Senarath ............ H04L 41/0681 |
| 2019/0196858 A1 | 6/2019 | Chakraborty et al. |
| 2019/0245758 A1* | 8/2019 | Li ....................... G06F 9/45558 |
| 2019/0303354 A1* | 10/2019 | Zamir .................... G06F 16/168 |
| 2019/0394284 A1* | 12/2019 | Baghel ................ H04L 67/1002 |

* cited by examiner

— TECHNIQUES FOR BINDING USER IDENTITIES TO APPROPRIATE VIRTUAL MACHINES WITH SINGLE SIGN-ON

CROSS-REFERENCE TO RELATED APPLICATIONS

This application is a continuation-in-part (CIP) of U.S. application Ser. No. 15/876,654 filed on Jan. 22, 2018, now pending, which claims the benefit of U.S. Provisional Application No. 62/449,123, filed Jan. 23, 2017. The contents of the aforementioned applications are hereby incorporated by reference.

TECHNICAL FIELD

The present disclosure relates generally to virtual machines, and more specifically to single sign-on features and binding user accounts and identities with appropriate virtual machines in an air gapped system.

BACKGROUND

Air gapping is a security measure that involves isolating a computer from an external connection. For example, an air gapped computer is one that is physically segregated and incapable of connecting wirelessly or physically with other computers or network devices. Air gapped systems and networks are used to protect many types of critical systems, such as those utilized in industries including finance, military, government, utility facilities, and the like.

Preventing a computer or a network from accessing an external network significantly limits the productivity of users using such a computer or network. For example, an application executed on an "air gapped" computer cannot access any resource over the Internet. To do so, the user would need to use a different computer having access to the Internet.

In the related art, there are a number of solutions attempting to isolate different computing environments on a single computer. However, such solutions do not provide a complete air gapping architecture. Furthermore, such solutions often suffer from user experience issues.

As a prime example, isolation solutions are based on virtual machine (VM) technologies. VMs are containers in which applications and guest operating systems can be executed. By design, all VMs are isolated from one another. This isolation enables multiple virtual machines to run securely while sharing hardware.

Although virtual machines share hardware (e.g., CPU, memory, and I/O devices, etc.), a guest operating system running on an individual virtual machine cannot detect any device other than the virtual devices made available to the guest operating system. In various virtualization environments, a hypervisor acts as an interface between the guest operating system and the host operating system for some or all of the functions of the guests. A host operating system directly interacts with the hardware. A host operating system may be Windows®, Linux®, and the like.

Endpoints (e.g., desktop or laptop computer) configured with VM isolation do not provide a complete defense against malicious code. One vulnerability point in such virtualization environments is the host operating system. That is, hackers can exploit security vulnerabilities integrated in such operating systems to propagate malicious code to the hypervisors and then to the guest operating systems. Further, a user can install malicious software directly on the host operating systems (i.e., outside of the virtualization environment). To prevent users from installing software directly on the host operating system, such an operating system should be restricted. However, such an approach limits the user experience as the user cannot install applications, plug-ins, change settings, and so on.

In addition to limited operations that can be performed by users on endpoints configured with VM isolation, the look-and-feel of the computing environment is different from more familiar unrestricted endpoints. Many standard user experience (UX) features are not available at all on the restricted endpoints. For example, a user cannot view, on the endpoint's desktop, multiple windows of different applications executed on different VMs. As another example, the user cannot copy data (e.g., a text snippet) from an application executed in one VM's environment to another VM's environment. Having these and other UX functions disabled on restricted endpoints significantly limits the ability to freely and easily interact and perform actions on the user device, i.e., the endpoint. Thus, the UX is negatively affected. As a result, many users prefer to use unrestricted and unsecured endpoints with full UX capabilities.

Additionally, even when multiple VMs are employed to segregate different environments, such as a work environment and a personal environment, it can be difficult for a user to remember which environment they are meant to be using, or which one they are currently operating in. This may lead to a user attempting to access information within one VM that can only be accessed in another VM, entering passwords in one VM for accounts tied to another VM, and the like. Further, there exists malware configured to present one VM as another in order to trick a user into entering data that can then be stolen.

Finally, keeping track of logon details can be challenging for many users, particularly if they are required to log on to multiple accounts within a VM, or across connected VMs. Secure passwords are often difficult to remember, and multi-factor authentication, while allowing for enhanced security, can be cumbersome to employ when a user is required to manually enter various codes, together with associated passwords, across multiple systems.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for binding a user account operable on an air-gapped computer to an appropriate virtual machine (VM), comprising: monitoring a plurality of VMs to determine an associated user account for each of the plurality of VMs, wherein the plurality of VMs are executed over the air-gapped computer, and wherein each of the plurality of VMs is a distinct security zone in the air-gapped computer; determining a current VM from the plurality of VMs to bind an associated user account thereto; and displaying user specific indications on desktop items associated with each user account.

Certain embodiments disclosed herein also include a non-transitory computer readable medium having stored thereon instructions for causing a processing circuitry to perform a process, the process including: monitoring a plurality of VMs to determine an associated user account for each of the plurality of VMs, wherein the plurality of VMs are executed over the air-gapped computer, and wherein each of the plurality of VMs is a distinct security zone in the air-gapped computer; determining a current VM from the plurality of VMs to bind an associated user account thereto; and displaying user specific indications on desktop items associated with each user account.

Certain embodiments disclosed herein also include an air gapped computer, including: a processing circuitry; and a memory, the memory containing instructions that, when executed by the processing circuitry, configure the system to: monitor a plurality of virtual machines (VMs) to determine an associated user account for each of the plurality of VMs, wherein the plurality of VMs are executed over the air-gapped computer, and wherein each of the plurality of VMs is a distinct security zone in the air-gapped computer; determine a current VM from the plurality of VMs to bind an associated user account thereto; and display user specific indications on desktop items associated with each user account.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
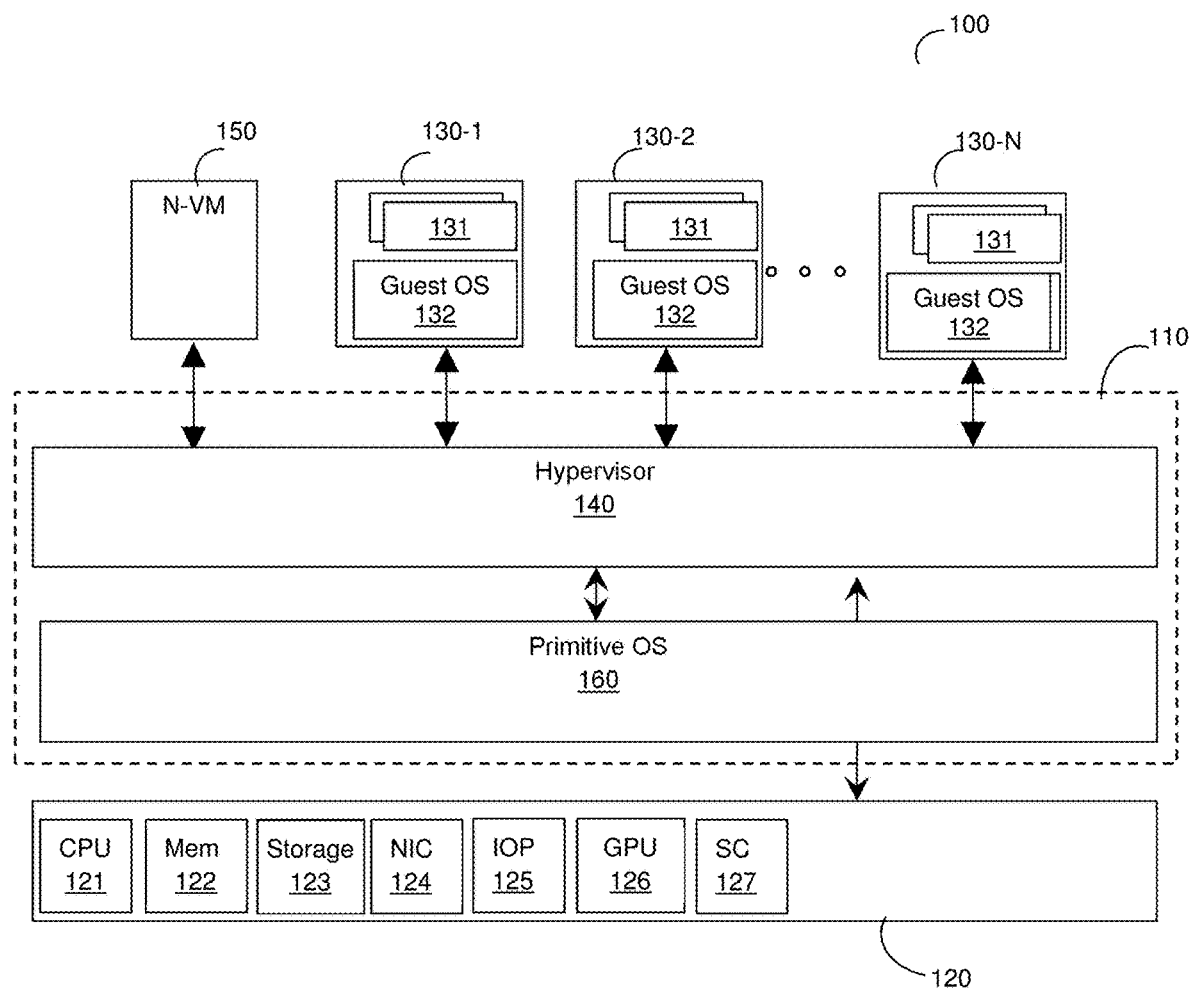
FIG. 1 is a schematic diagram of an endpoint arranged with a virtualized environment according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments, a virtualized environment designed to secure endpoints from execution of malicious code is provided. Specifically, the disclosed embodiments allow for operation of any endpoint in a virtual air-gap mode, thereby ensuring that the endpoint is isolated from unsecured resources (such as networks, external drives, and the like). The disclosed virtualized environment allows for executing multiple applications in a number of different secured zones, while providing a seamless user experience.

In an embodiment, each zone is isolated from other zones, and each application that can be accessed by a user is executed in one of a few virtualized environments. In addition, the virtualized environment does not require a full host OS to interface between the security zones and the hardware of the endpoint. As another security measure, a user of the endpoint cannot configure or directly access any element of the underlying host environment.

FIG. 1 shows a schematic diagram illustrating an endpoint 100 arranged with a virtualized environment 110 according to an embodiment. The endpoint 100 may be a computing device, such as a personal computer (PC) in a form factor of either a laptop or desktop.

The endpoint 100 includes hardware 120, that can be found in a standard desktop or laptop computer. The hardware 120 may include, for example, a processing circuitry (CPU) 121, a memory (Mem) 122, a storage 123, a network interface card (NIC) 124, input/output (I/O) peripherals (IOP) 125, a graphics processing unit (GPU) 126, and a sound card (SC) 127. The processing circuity 121 may be realized by one or more hardware logic components and circuits. For example, and without limitation, a general-purpose microprocessor, a central processing unit (CPU), a multi-core CPU, a digital signal processor (DSP), and the like, or any other hardware logic components that can perform calculations or other manipulations of information. The memory 122 may be volatile (e.g., RAM, etc.), non-volatile (e.g., ROM, flash memory, etc.), or a combination thereof.

The storage 123 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information. The NIC 124 allows the endpoint 100 to communicate with external networks over a wired connection, a wireless connection, or both.

The NIC 124 may transmit communication media, receive communication media, or both. For example, the NIC 124 may be in the form of a modem, an integrated network interface, a radio frequency transmitter/receiver, an infrared port, a USB connection, and the like.

The I/O peripheral 125 allows connectivity to external peripherals, such as a disk drive, printers, wireless keyboard, pointing device, a microphone, a speaker, a docking station, and the like. The I/O peripherals 125 may allow connectivity through USB ports, PS/2 ports, infrared ports, and the like. The GPU 126 provides connectivity to a monitor display.

The sound card 127 (or audio card) provides input and output of audio signals to and from an endpoint under control of the guest OS.

It should be noted that other hardware components are included in a typical hardware of an endpoint which are not illustrated herein. Such components may include, but are not limited to, a motherboard, a power source, and the like.

According to the disclosed embodiments, the virtualized environment 110 is designed to provide a complete virtual air-gapping for a plurality of security zones 130-1 through 130-N, where N is an integer equal to or greater than 1 (hereinafter referred to individually as a security zone 130 and collectively as security zones 130, merely for simplicity purposes). The virtualized environment 110 is also arranged to include a hypervisor 140 controlling the security zones 130, a networking VM (N-VM) 150, and a primitive operating system (OS) 160.

Each security zone 130 is realized as a virtual machine executing a plurality of applications 131 over a guest OS 132. Each security zone 130 is configured to host applications based on their security and sensitivity levels. For example, a security zone 130 may be a corporate zone for general corporate applications, a personal zone for untrusted content and applications, a privileged IT zone for production applications, a financial zone for sensitive financial applications (e.g., SWIFT), a zone for critical infrastructure applications (e.g., SCADA), and so on.

Each security zone 130 is completely isolated from each of the other zones 130. That is, an application executed in zone 130-1 cannot access any content or applications accessed, stored, or executed in zone 130-2.

As an example, the zone 130-1 may be a trusted corporate zone (executing sensitive corporate applications) while the zone 130-2 can run applications that can access untrusted applications and resources. That is, the corporate zone 130-1 provides access to sensitive corporate resources and can be strictly locked down, while the personal zone 130-2 can provide free access to the Internet and allow the user to install and run any application.

According to the disclosed embodiments, the virtualized environment 110 provides a complete separation between the zones 130-1 and 130-2, thereby providing a complete air-gap between the zones. As will be discussed below, applications from different zones 130 are displayed on the same display, content can be copied from one zone to another (under a control of a user, and based on administrator-defined policy), and switching between zones is seamless. Thus, the virtualized environment 110 would allow improved productivity for users.

The operation of the security zones 130 is controlled by the hypervisor 140. Specifically, the hypervisor 140 is configured to instantiate a VM for each security zone 130. The applications 132 are executed in each corresponding VM. The hypervisor 140 is configured to present the zones 130, and hence the applications 131 executed therein, with a unified user experience (UX).

According to an embodiment, the hypervisor 140 is also configured to instantiate the N-VM 150. The N-VM 150 is not accessible to the user, i.e., no user applications are executed therein and no local configuration of the N-VM 150 is allowed. The N-VM 150 is configured to control and regulate access to the external networks (not shown in FIG. 1) through the NIC 124. Examples for such networks may include, but are not limited to, the Internet, a local area network (LAN), a virtual private network (VPN), a short-range network (e.g., Bluetooth®), and the like. The operation of the N-VM 150 is discussed in greater detail below.

According to the disclosed embodiments, after instantiating the VMs of the zones 130 and the N-VM 150, the hypervisor 140 is configured to virtualize the components of the hypervisor 140. That is, for each guest OS 132, the hypervisor 140 provides a limited set of virtualized hardware services. For example, when the user is in a security zone 130-1 access to a microphone may be permitted to access the applications 131 running in that zone.

In an embodiment, the hypervisor 140 is configured to instantiate and control the VMs, as well as to virtualize hardware services to such VMs. This allows for programming the hypervisor 140 with a significantly lower number of code lines, thereby reducing the risks of vulnerabilities that can be exploited by, for example, the guest OS 132. In an embodiment, controlling the VMs (zones 130) includes enforcing security policies for each zone, as discussed in greater detail below.

Figure 2:
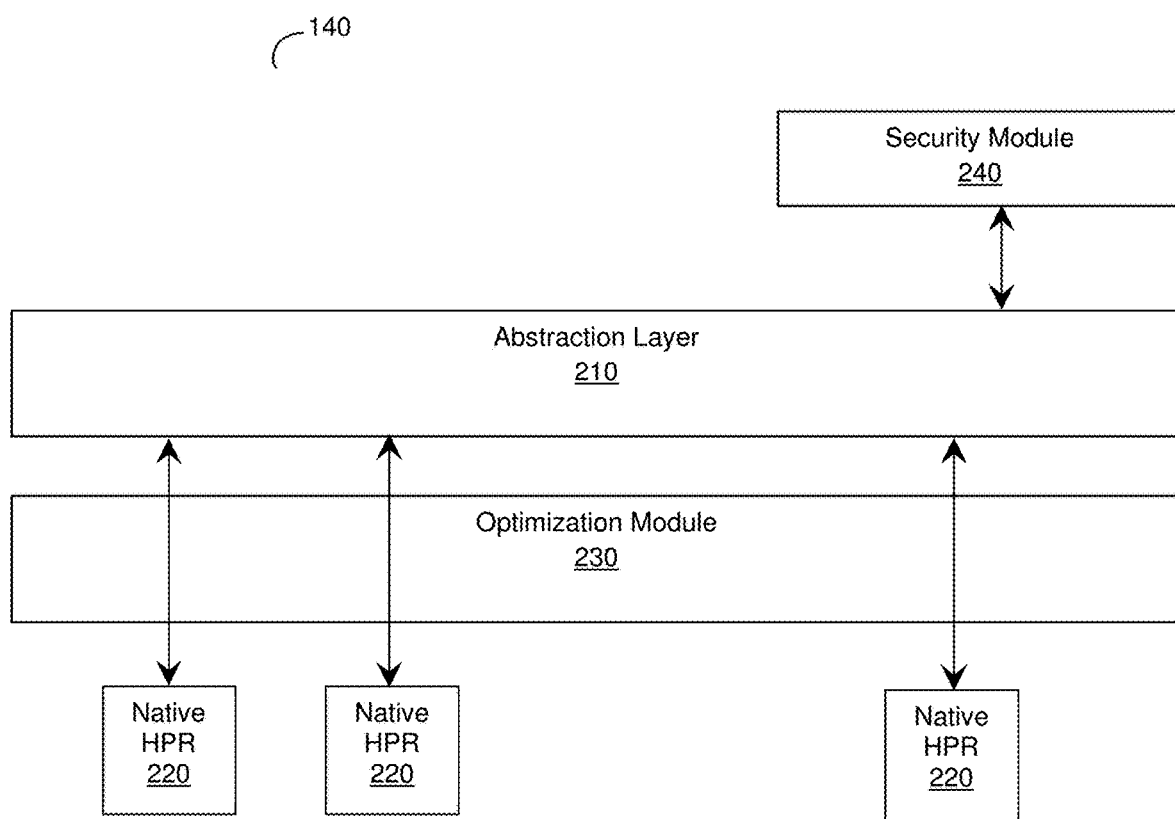
FIG. 2 is a block diagram illustrating the arrangement of a hypervisor according to an embodiment.

FIG. 2 is an example block diagram illustrating the arrangement of the hypervisor 140 according to an embodiment. The hypervisor 140 includes an abstraction layer 210 that allows the integration with a plurality of commercially available native hypervisors 220. Non-limiting examples for such native hypervisors 220 include Oracle® VM, Microsoft® Hyper-V®, and the like. The native hypervisors 220 primarily provide access to guest OSs such as Windows® 10, Windows® 7, Linux®, and the like.

The hypervisor 140 also includes an optimization module 230 configured to perform optimization processes to accelerate or otherwise improve the operation of the native hypervisors 220. Such optimization processes include, but are not limited to, display optimization (3D and graphic rendering), audio optimization (playback and audio recordings), and power optimization.

In an embodiment, the audio optimization includes bypassing all emulation layers, typically performed by a standard native hypervisor when emulating a sound card (e.g., sound card 127, FIG. 1). To this end, the optimization module 230 is configured to interact directly with an application layer of a guest OS 131, so as to receive the audio signals. The optimization module 230 replays the audio signals to the audio card in the host's hardware device. This allows for reducing latency involved by emulating the standard audio hardware, thereby improving latency and performance.

In another embodiment, the display optimization includes causing the GPU (e.g., GPU 126, FIG. 1) to render only specific windows of applications running in a VM (zone), and displaying such windows on a desktop display of another VM. To this end, the optimization module 236 is configured to provide the GPU 126 only with the regions of the application windows in the guest OS. Such regions can be deducted from the data provided by a guest OS. The optimization module 230 is further configured to capture a full screen display of the VM and instruct the GPU 126 to crop that VM's virtual display window while not rendering any region that does not belong to one of the application windows in the guest OS. It should be noted that the GPU 126 would typically show the VM's virtual display as a full screen window. This optimization allows minimal data copy of each frame, resulting in improved video performance.

In yet another embodiment, the power optimization is designed to extend the operating hours of a battery (not shown). The virtualized environment (110, FIG. 1) is designed to run multiple operating systems in multiple VMs. This can rapidly drain battery power as there is intensive usage of the processing circuitry (121, FIG. 1) and I/O devices by multiple operating systems instead of just one I/O device on a normal machine.

The optimization module 230 is configured to "freeze" all virtual machines (i.e., switch their current states to an idle state) that do not have an active foreground window. In their idle state, VMs no longer consume CPU or perform I/O operations and the memory state of each idle VM remains at the latest state. The applications executed in the idle (frozen) VMs are displayed in their last state before the freeze operation. When the user switches the focus back to one of the frozen VMs, the optimization module 236 changes its state to that of a normal operation. It should be noted that the power optimization provides a security benefit, as a frozen VM cannot be attacked because it does not have any attack-vulnerable surface at that time.

According to the disclosed embodiments, the hypervisor 140 also includes a security module 240 configured to directly communicate with the VMs 130 and 150. That is, any request to access the hypervisor 140 is received and handled by the security module 240. In an embodiment, a request (or command) to access a resource of the hypervisor 140 is captured by the security module 240 such that the request does not reach the OS 160. For example, a keyboard shortcut (e.g., Ctrl+C) would be captured and handled by the hypervisor 140. That is, the hypervisor 140 disclosed herein prevents any interfacing of a user device with the primitive OS 160. The security module 240 is configured to monitor and control the operation of other UX functions, such as URL redirection and rendering of unified desktop's display. Such UX functions are discussed in greater detail below.

Returning to FIG. 1, the primitive OS 160 is configured to merely execute device drivers. For example, a display driver or a PCIe chipset driver will be executed by the primitive OS 160. The primitive OS 160 does not and cannot access any user applications (e.g., applications installed by a user), any user-controlled OS, or any user commands. That is, the primitive OS 160 cannot execute any code which may be originated from any software installed or uploaded by the user. For example, a user may access an insecure website from a browser running in a personal secure zone and unintentionally download malware. The malware cannot access and cannot be executed by the primitive OS 160. Further, the user cannot directly install software applications outside of the security zones 130, and specifically cannot install software directly on the primitive OS 160.

In an embodiment, the primitive OS 160 is configured to execute only pre-signed code.

Thus, any malware code will not be executed by the primitive OS 160. In yet another embodiment, the primitive OS 160 cannot access the NIC 124, thus, cannot access an external network. The communication is performed through the N-VM 150. To this end, any TCP/IP activity by the primitive OS is controlled and restricted by the N-VM 150.

In an example implementation, the primitive OS 160 may implement a virtual NIC (not shown) configured with a virtual IP to allow communication with the N-VM 150. In yet another embodiment, the files of the primitive OS 160 are non-persistent, ensuring that the primitive OS 160 is reset to its original configuration after each boot of the endpoint 100. In yet another embodiment, the files of the primitive OS 160 are encrypted, so that cannot be tampered or manipulated.

In an embodiment, the primitive OS 160 may be, for example, Windows®, Mac OS®, or Linux®, that has been configured to allow only execution of drivers and to eliminate any functionality as discussed herein.

Figure 3:
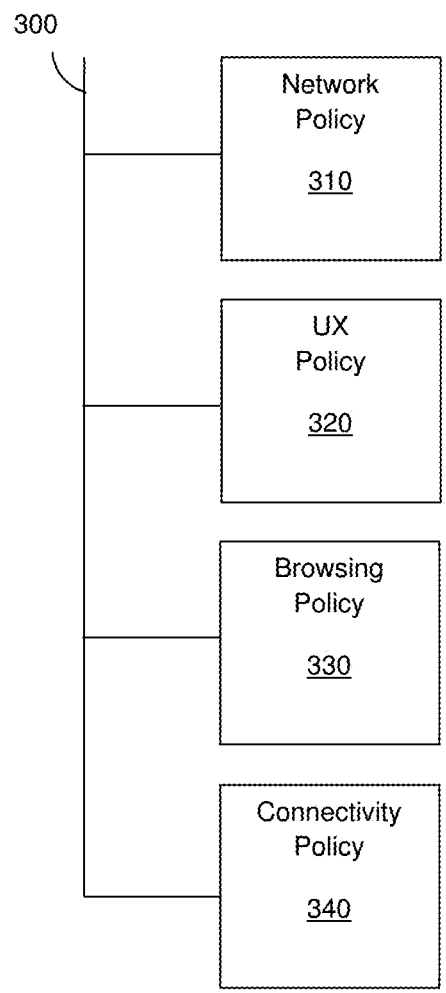
FIG. 3 is a policy diagram of a security policy structured according to an embodiment.

The N-VM 150 is configured to manage network connectivity. That is, the N-VM 150 is configured to monitor and police all communications between the applications 131 in the different security zones 130 and external networks (not shown in FIG. 1). In an embodiment, the N-VM 150 is also configured with a network policy (e.g., the network policy 310, FIG. 3) for each security zone 130 determining which networks can be accessed for the zone. The network policy may be defined for each application 131 in a zone or for a group of applications. Further, the access may be defined with a set of permissions. As an example, full access to a network resource, limited access to a network resource, access permitted only after authentication, and so on.

In an embodiment, all network access requests are routed to the N-VM 150. In response, the N-VM 150 is configured to identify the security zone 130 (i.e., a VM) requesting access to an external network. The N-VM 150 allows or denies the access request based on the network policy determined for the requesting zone. As an example, requests from a personal zone to a corporate network will be blocked by the N-VM 150, while requests from a corporate network to the same network will be allowed. The network policies are pre-configured using, for example, a management server (not shown in FIG. 1) connected to the endpoint 100. The management server is discussed in detail herein below.

It should be appreciated that the primitive OS 160, the hypervisor 140, or both, do not manage the network connection, and as such do not allow or deny connections to external networks. It should be further appreciated that physical connection to the external networks are established through the NIC 124 under the control of the N-VM 150. The N-VM 150 operates in a non-persistent mode and is reverted to its initial state upon each connect or disconnect event, adding another layer of security in case the N-VM somehow becomes infected.

In an embodiment, the N-VM 150 is configured to perform network identification at various layers, e.g., a MAC layer, a TCP/IP layer, and an application layer (e.g., HTTPS or SSL identification). In another embodiment, the network policies can be enforced by applying access control or firewall rules at TCP/IP or application layers (e.g., layers 4 or 7 of the OSI module). In yet another embodiment, the N-VM 150 is configured to allow connection using VLAN tags or through DHCP proxy implemented in the N-VM 150.

It should be appreciated that the virtualized environment 110 provides a complete virtual air-gapping secured solution to applications executed in each security zone even if one or more of the zones becomes vulnerable. The design of the virtualized environment 110 assumes that all VMs, guest OSs, and applications executed in the zones 130 are not trusted. Additional layers of protection are achieved by means of the hypervisor 140, the N-VM 150, and the limited functionality of the primitive OS 160.

In an example scenario, a corporate zone (e.g., one of the security zones 130) is infected by a malicious bot communicating with a command-and-control server. According to the disclosed embodiments, the bot cannot communicate with its command-and-control server over the Internet, as such access attempt will be blocked by the N-VM 150. That is, the N-VM 150 may allow access to an internal corporate network or a whitelisted set of cloud hosts, as defined in a network policy for the corporate zone, and block access to any other network location.

In an embodiment, VMs of the security zones 130 are non-persistent. That is, the VMs are initialized to an original configuration after each boot, logoff, application event, and so on. That is, VMs infected with malware will return to their initial "clean" state after, e.g., each boot.

The operation of the security zones 130 is also regulated by additional preconfigured policies. In an embodiment, illustrated in FIG. 3, a security policy 300 is preconfigured for a security zone 130. A security policy 300 includes at least a network policy 310, a user interface (UX) policy 320, a browsing policy 330, and a connectivity policy 340. A security policy 300 is configured for each security zone 130 by, for example, a management server.

In an example embodiment, the UX policy 320 defines which user interface actions are allowed to be performed by the user in the respective zone. Examples for such actions include, but are not limited to, clipboard use, printing, screenshotting, and the like. As a non-limiting example, the UX policy 320 can define if the user can copy content and paste such content in a different zone, or if content from a different zone can be pasted in the current zone. Content may include, for example, text, images, files and the like. The UX policy 320 may also designate what type of content can be copied, pasted, or both.

In an embodiment, the cross-transfer of content between security zones is allowed only when explicitly approved by the user. This ensures that malware cannot copy content from one zone to another.

The browsing policy 330 defines a whitelist of URLs, domain names, or other network locations that can be accessed from a browser executed in the respective zone. This allows, for example, blocking browsers from accessing malicious URLs when the user mistakenly browses to such URLs in the wrong security zone. In an optional embodiment, the blocked URL can be accessed and launched in another security zone which is allowed to access that URL. It should be noted that the browsing policy 330 is different from the network policy 310 in that it restricts access to certain URLs after a network connection has already been established per the network policy. The network policy 310 is discussed above.

The connectivity policy 340 defines a set of allowed peripheral devices through wired or wireless connections. As an example, the connectivity policy 340 may define if connections through a USB plug are allowed or restricted. Restricted connectivity may limit all connections or connections to designated USB devices (e.g., printers may be allowed, while flash drives may be prohibited). Examples for other wired connections may include, for example, DisplayPort, Thunderbolt™, HDMI®, PS/2, and the like. Wireless connections may include short range connections that allow wireless docking of peripheral devices (e.g., WiGig™), and the like.

Returning to FIG. 1, the disclosed embodiments allow concurrent execution of applications 131 from different security zones 130. In one configuration, one security zone (e.g., 130-1) is set as a primary zone, while another secure zone (e.g., 130-2) is set as a secondary zone. The applications and OS of the primary zone are executed in the foreground, while those of the secondary zone are executed on the background. Primarily, a user can interact with applications of the primary zone, i.e., windows of such applications are displayed on the endpoint's display.

In one embodiment, the applications from the secondary zone can be displayed on the endpoint's display providing the user with the ability to interact with applications from different zones. Windows of applications from different zones are optionally marked differently.

Figure 4:
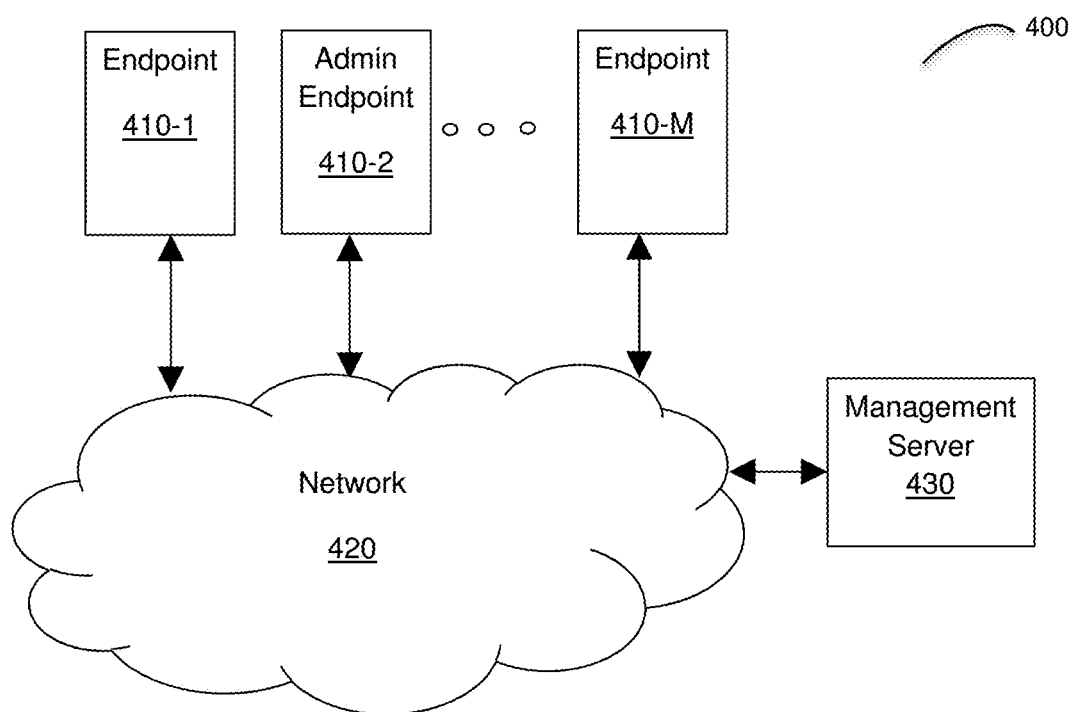
FIG. 4 is a network diagram illustrating a deployment of a management server according to an embodiment.

FIG. 4 shows an example network diagram 400 illustrating a deployment of a management server 430 according to an embodiment. As noted above, the security zones can be configured through the management server 430. This includes defining the type of each zone, the zone's guest OS, and the applications that can be installed and executed in the zone. For example, a security zone can be defined to be a corporate zone running Linux OS and corporate approved applications.

In another embodiment, the security policy for the security zone is also defined through the management server 430. As noted above in FIG. 3, a security policy may include network, UX, browser, and connectivity policies.

In an embodiment, the management server 430 may include preconfigured security zones and policies that can be easily uploaded to a new endpoint. In yet another embodiment, the management server 430 can be utilized to clone security zones from one endpoint to another. Therefore, the management server 430 simplifies the process of reconfiguring new endpoints.

As shown in FIG. 4, the management server 430 is connected to a plurality of endpoints 410-1 through 410-M via a network 420, where M is an integer equal to or greater than 1. The network 420 may include a local area network (LAN), a wide area network (WAN), the Internet, and the like. In an embodiment, the management server 430 may be deployed on-premises of an organization and managed by the IT personnel of the organization. In yet another embodiment, the management server 430 may be deployed in a cloud computing platform, such as a private cloud, a public cloud, or a hybrid cloud. In such deployment, the management server 430 can serve a plurality of different tenants.

According to the disclosed embodiments, the management server 430 is a secured device. As such, only specific designated endpoints can access the management server 430. In an embodiment, the server 430 accepts connection requests from endpoints including valid certificates, e.g., SSL client certificates. Such certificates are installed only on the designated endpoints.

In the example diagram shown in FIG. 4, only the endpoint 410-2 can access the management server 430 over a secured connection (e.g., SSL connection). The endpoint 410-2 may be, for example, of an administrator. In a further embodiment, only a specific security zone (VM) within the designated endpoint 510-2 can access the management server 430.

Furthermore, when the management server 430 accesses any of endpoints 410-1 through 410-M, the access is performed over a secured connection. Any connection attempt made by the management server 430 to an endpoint 410-1 through 410-M is verified by a hypervisor (e.g., the hypervisor 140 of FIG. 1). That is, the hypervisor verifies the certificate of the management server 430 before accepting a connection with the management server 430.

The management server 430 may be structured as a computing device including a processing circuitry coupled to a memory, a storage, and a network interface (not shown in FIG. 4).

The processing circuitry may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory may be volatile (e.g., RAM, etc.), non-volatile (e.g., ROM, flash memory, etc.), or a combination thereof. In one configuration, computer readable instructions to implement one or more embodiments disclosed herein may be stored in the storage.

In another embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry to perform the various processes described herein with respect to the operation of the management server, such as configuring security zones and policies with the endpoints.

The storage may be magnetic storage, optical storage, and the like, and may be realized, for example, as flash memory or other memory technology, CD-ROM, Digital Versatile Disks (DVDs), or any other medium which can be used to store the desired information. The storage may store the received templates of security zones, policies defined for each zone, SSL certificates, configuration of entire secured zones, and so on.

The various embodiments disclosed herein allow for operation of the air-gapped endpoint 100 with an enhanced and seamless user experience. A user using the air-gapped endpoint 100 would experience the same look-and-feel of a traditional (unrestricted) endpoint. To this end, various UX features are implemented by the hypervisor 140 in the virtualized environment 110.

In an embodiment, one of the UX features includes enabling the display of multiple application windows executed in different security zones over the endpoint's 100 desktop. This feature is further demonstrated in FIG. 5.

Figure 5:
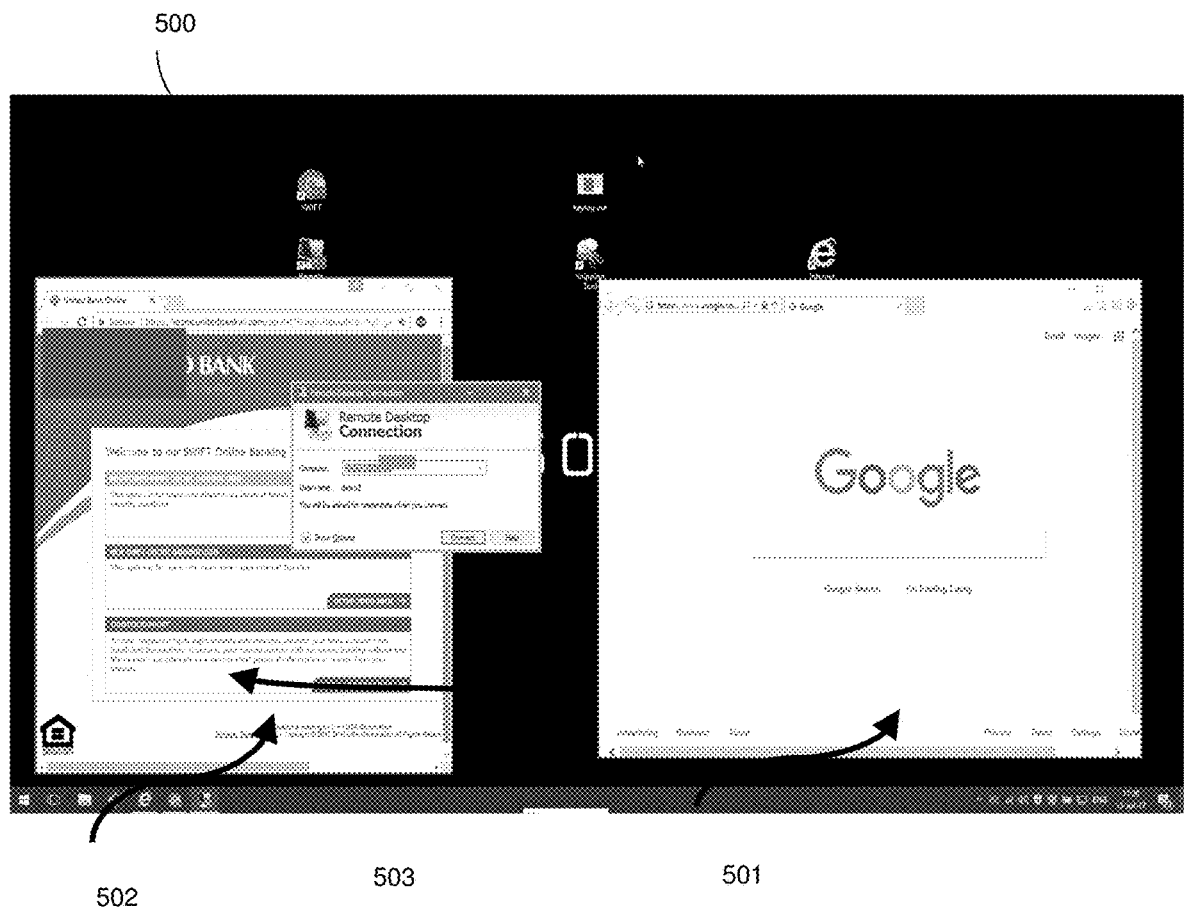
FIG. 5 is a screenshot of an endpoint display.

FIG. 5 shows an example screenshot 500 of an endpoint's desktop display including windows 501, 502, and 503. The windows 501 and 502 are of web browsers, while the window 503 is a remote desktop client. In this example, the application of window 501 is executed in a first security zone (e.g., a corporate zone) while the applications of windows 502 and 503 are executed in a second security zones (e.g., a privileged zone). Border colors of windows (not shown, see FIG. 11) are utilized to distinguish between the first and second zone. In the embodiment illustrated in FIG. 5, a user can switch between the windows 510 through 530, that is, between zones.

In another embodiment, only applications of the primary security zone are displayed. In order to display windows of applications from the secondary security zone, application windows in the primary security zone are hidden and the application windows in the secondary security zone are exclusively shown. The switching between zones can be performed using a predefined UX command (e.g., a keyboard shortcut, such as Ctrl+F1, a GUI element, such as an icon or a taskbar shortcut, and the like).

It should be emphasized that regardless of the display mode, applications executed in different zones cannot access each other. There is a complete separation between zones and applications and guest OS executed therein. However, from the user's perspective, the user can access any window and interact with the applications executed therein seamlessly.

The display of multiple windows of different security zones is controlled by the hypervisor 140 (FIG. 1). Specifically, as noted above, the hypervisor 140 is configured to monitor all user activity. This includes the way the user orders windows on the desktops and relationships between windows. Relationships between windows define, for example, which windows are placed in the back and in the form front, a z-order, and owned windows. The z-order of a window indicates the window's position in a stack of overlapping windows. The window stack is oriented along an imaginary axis, the z-axis, extending outward from the screen. The window at the top of the z-order overlaps all other windows. The window at the bottom of the z-order is overlapped by all other windows. Owned windows are windows belongs to applications from the same security zone.

The hypervisor 140 is configured to render a first layer illustrating a desktop view of a first security zone. Such desktop view includes all active windows. Then, the hypervisor 140 renders a cropped desktop display of the second security zone, only displaying the clipped regions of windows that should be displayed to maintain the Z-order by the user. As such, the desktop's display would provide an illusion of a single window manager/desktop environment.

Figure 6:
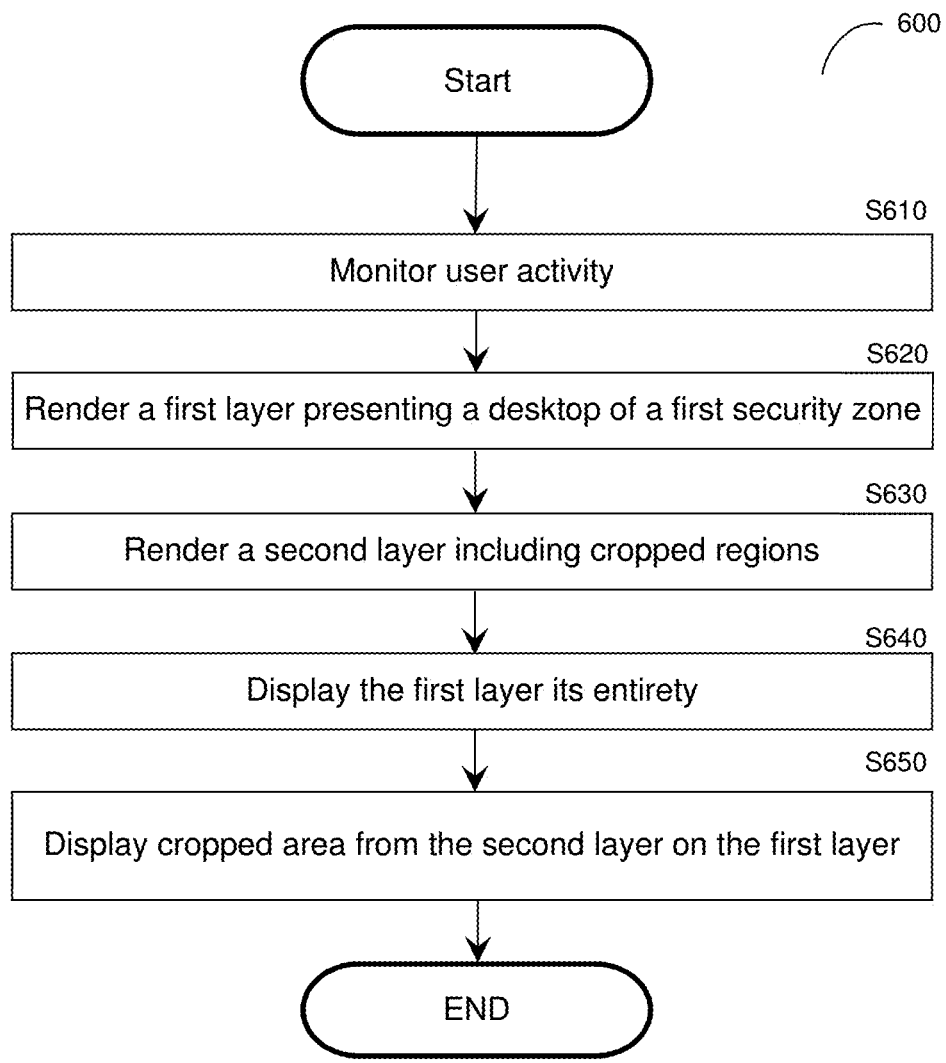
FIG. 6 is a flowchart illustrating a method for rendering a unified desktop display for multiple security zones according to an embodiment.

FIG. 6 is an example flowchart 600 illustrating a method for rendering a unified desktop's display for multiple security zones according to an embodiment.

At S610, the user activity is monitored to at least provide an indication of current window relationships. This may include the relationships of windows operable in each security zone and their z-order.

At S620, a first layer presenting a desktop of the first security zone is rendered. The first layer includes all applications executed in the first zone arranged according to their order and size as set by the user.

At S630, a second layer presenting a cropped desktop display of the second security zone is rendered. As noted above, this second layer only includes regions of windows that should be displayed to maintain the z-order set by the user. In an embodiment, border lines of windows in the first and second desktops are marked differently, e.g., by different colors, to distinguish between the different security zones.

At S640, the first layer of the first desktop is presented in its entirety on the endpoint's display. That is, all windows of the first desktop are presented. Then, at S650, the second layer, i.e., the cropped regions, are displayed on top of the first layer. The cropped display includes only the clipped regions of windows that should be displayed to maintain the z-order.

It should be noted that the user activity is continuously monitored, and any changes in the windows arrangement (e.g., changing location, order, size, closing an application, and/or launching an application) would trigger a re-cropping of the first and second layers, thus changing the user's view to keep the illusion of a single desktop's display.

It should be further noted that the first and second security zone can be, without limitation, a primary and secondary security zone, respectively. In an embodiment, when a user toggles from the primary to the secondary security zone, the first and second layers are switched as well. That is, the second layer would be displayed in its entirety, and a cropped version of the first layer would be displayed on top of the second layer.

Figure 7:
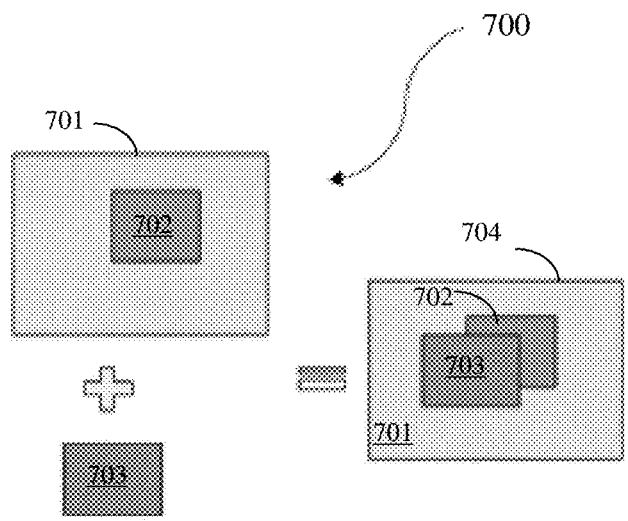
FIGS. 7 and 8 are illustrative diagrams showing the various arrangement of windows when rendering a unified desktop display.
Figure 8:
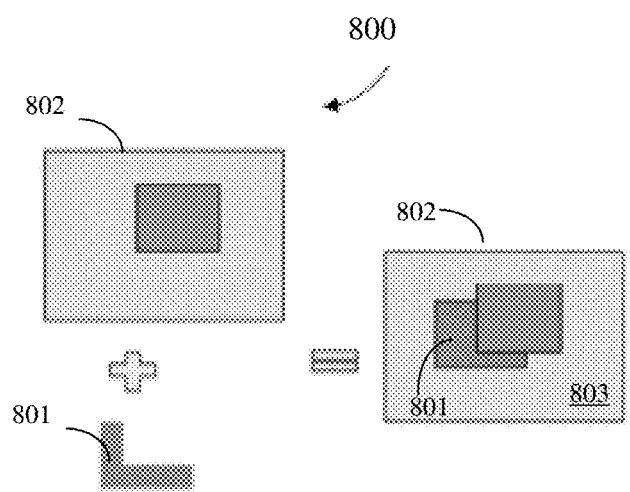

Illustrative diagrams showing the various arrangement of windows are shown in FIGS. 7 and 8. In FIG. 7, a first layer 701 includes a single window 702 for a first security zone. The cropped second layer 703 (also including only one window) is of a second security zone. The unified desktop 704 to be displayed includes the second layer 703 displayed on top of the entire first layer 701.

In another embodiment, discussed with reference to FIG. 8, a unified desktop can be rendered by cropping the area 801 of a first layer of the first security zone that intersects with a second layer 802 of the second security zone. In endpoint's display 803, windows from both layers can be displayed in such way that the second layer 802 is displayed on top of the cropped area of the second layer 801.

As noted above, the user activity is continuously monitored, and any attempt by a user to modify position, dimensions, state, or a combination thereof, of a guest entity while the virtual clipping layer is active may be identified. The modification may be applied to the single desktop environment, such that the modification as a result of user interaction to a graphical user interface in a form of overlapping windows is updated in real-time.

The modification can be additionally configured to toggle the activation of the first virtual layer and the second virtual layer in the graphical user interface interchangeably based on a user interaction, where the user interaction involves manipulation by the user of the interface using the integrated access of the mouse, keyboard, screen, and resources in the single user interface comprising a single desktop environment. The user interaction includes managing changes to applications and interface components of the displayed environments based on default security policies, predetermined security policies, or both, using the integrated access to the mouse, keyboard, screen, and resources in the single user interface comprising a single desktop environment in real-time.

In an example embodiment, the integrated access of the mouse, keyboard, screen, and resources in the single user interface comprising a single desktop environment in real-time acquires a priority condition based on the default security policies, predetermined security policies, or both. For example, the keyboard can be redirected to the VM that the top entity (guest window) belongs to. The host can also show special entities (e.g., special host windows that allow global settings to be changed), that can be displayed on top of all security zones.

The clipping action will isolate an area in the second VM in the area of the host entity. The allows the host entity to appear as the top window. The modification can also be configured to toggle the activation of the first virtual layer and the second virtual layer in the graphical user interface interchangeably based on the user interaction.

In an embodiment, entities (guest windows) of the second security zone can be represented in the task-bar and in an app-switcher (e.g., as initiated by a keyboard shortcut, such as ALT+TAB) with the corresponding icons, even though they are not running on the respective VM. This creates an illusion for the user that the entities from the second security zone are running on the first security zone. That is, it appears to the user that applications from both security zones are executed on the first (primary) security zone.

According to the disclosed embodiments, a single-sign-on (SSO) function is provided in order to ease the log-in to the air-gapped endpoint. Specifically, the SSO allows a user of the end-point to log-in once to one of the security zones (e.g., to a guest operating system executed therein) and then to seamlessly log into the other security zones without providing login credentials a second time.

In order to the allow the SSO function, all guest operating systems are booted when a user logs into a primary security zone (e.g., zone 130-1 of FIG. 1). The guest OS in the primary zone captures the login credentials and passes the credentials to the hypervisor (e.g., the hypervisor 140 of FIG. 1) via a designated communication channel between the guest OS (132) and the hypervisor.

The hypervisor then automatically provides the credentials to all other guest operating systems that have been booted. In some configurations, each guest OS is configured with a proxy component that captures the credentials and passes them to the hypervisor. The proxy component can also perform an automatic login process using the user's credentials provided by the hypervisor.

In an embodiment, when the hypervisor receives a message indicating that the user has locked any guest OS, the hypervisor is configured to automatically lock the other guest operating systems executed in the other security zones.

In an embodiment, when the hypervisor receives a message indicating that the user has logged off any guest OS, the hypervisor is configured to automatically log off the other guest operating systems executed in the other security zones According to another embodiment, cross-transfer of content between security zones is provided. This UX function allows the user to seamlessly use a single keyboard to copy and paste content across different zones. For example, a user can mark and copy content from one application in one security zone and paste that content to another application in a different zone. The process for cross-transfer of content is secured and controlled by the hypervisor (the hypervisor 140 of FIG. 1).

To this end, the hypervisor is configured to monitor all UX commands executed by the user of the endpoint, including, but not limited to, keystrokes. When a copy command is detected (e.g., Ctrl+C or a mouse selection), a process (e.g., an agent) running in the zone the content was copied from notifies the hypervisor on the copied content and the zone (of VM) ID.

When the hypervisor detects a paste command (e.g., Ctrl+V), the hypervisor identifies the target zone to paste the content, and determines if the operation is permitted. The determination, in one embodiment, is based on the UX policy. If the content transfer is allowed, the hypervisor notifies the user via a designated notification that a cross-VM transfer is taking place. The user can be prompted to approve the content transfer. In an embodiment, an approval dialog box is displayed to the user in a trusted host window. Malware running in one of the guest VMs cannot view, access, or control the dialog box or any buttons therein.

It should be appreciated that only physical keystrokes or mouse clicks that have been detected would trigger an actual content transfer. This prevents a malware application executed in a security zone to initiate content transfer.

In yet another embodiment, to enhance the user experience when interacting with an air-gapped endpoint, a browser application is enabled in each security zone, as long as the requested URL is not malicious or blocked by the browsing policy of each zone. According to this embodiment, the hypervisor 140 is configured to monitor any URL accessed by a user. When the user is not permitted to access the requested website in one security zone, the hypervisor 140 can redirect the request to another security zone, if such a zone exists, and to automatically open the website in that zone. That is, the hypervisor would cause the VM to launch a browser in the zone that the URL is redirected to. It should be appreciated that the automatically launching of websites provides a seamless browsing experience, as the user is not aware that the original access attempt has been blocked or redirected.

For example, if the user attempts to access www.facebook.com from a corporate security zone, such a request may be directed to the personal security zone so that the user can access the website from that security zone.

In an embodiment, to prevent a malware application from using the URL redirection capability to leak data between the environments, the URL redirection is enabled only when such operation is acknowledged by the user and/or when physical keystrokes or mouse clicks are detected.

As noted above, the various UX functions discussed herein as being performed or otherwise controlled by the hypervisor (e.g., the hypervisor 140). The hypervisor is configured to control the security zones of a networking VM (N-VM), and a primitive operating system (OS). In an embodiment, the component in the hypervisor controlling the UX functions is the security module 240, described with reference to FIG. 2.

Figure 9:
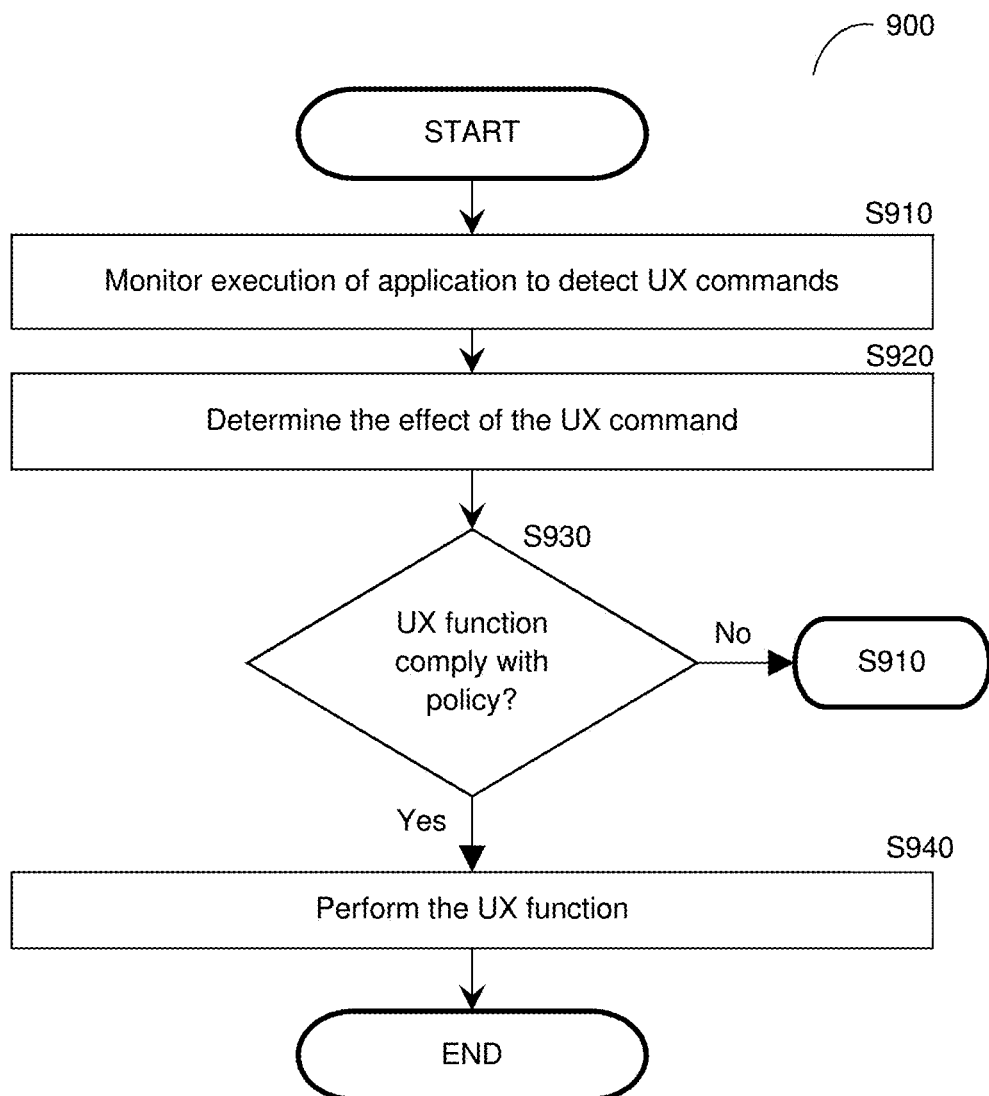
FIG. 9 is a flowchart illustrating a method for performing UX functions on an air-gapped endpoint according to an embodiment according to an embodiment.

FIG. 9 shows an example flowchart 900 illustrating a method for performing UX functions on an air-gapped endpoint according to an embodiment. The UX functions, when performed, would allow seamless UX operations on the endpoint.

The method, in an embodiment, is performed by a hypervisor operable in a virtualized environment of the endpoint. The hypervisor is initialized to be executed over a primitive OS. The initialization occurs when the endpoint boots. As discussed in detail above, the primitive OS is a limited version of an OS designed to only run drivers of hardware components.

Prior to the execution of the method, multiple secure zones are created in the endpoint by initiating a plurality of VMs by a hypervisor executed over a primitive OS. Each VM runs its own guest OS and a set of applications. A security policy is associated with each security zone defining at least one of, or a combination of: a network policy, a UX policy, a browsing policy, and a connectivity policy. The type of the guest OS, applications and policies of each security zone can be retrieved from the management server, e.g., the server 530. In an embodiment, an operating system (OS) booted with the endpoint may be migrated to operate as one of the guest OSs. In an embodiment, a networking VM may be instantiated by the hypervisor. The networking VM is configured with the network policy of each security zone.

At S910, execution of the applications and guest OS in the security zones are monitored to detect at least UX commands, requests, or actions (collectively referred as UX command or commands). Such UX commands may include a request to open a new application window, resize an open window, copy content, paste content, launch a website, and so on. Any monitored UX command may include the requested function to be performed (e.g., resize window), source VM (zone), and destination zone, if applicable.

At S920, for each monitored command, it is determined if the execution of the UX command would affect at least one security zone differently than the zone from which the command was initiated. That is, the UX command, if performed, not only would affect a primary security zone (executing applications in the foreground), but also applications executed in the background by VMs in a secondary security zone. It should be noted that the primary security zone is also executed in a VM.

At S930, it is determined if execution of such UX commands would trigger a UX function that would maintain compliance with the security policy, and in particular with the UX policy. For example, a UX command may be a copy command (CTRL+C). This may trigger a UX function of cross-transfer of content. If the UX policy does not allow such transfer, the operation is blocked.

If the determination as S930 in is the affirmative and results with a Yes answer, execution proceeds with S940; otherwise, execution returns to S910.

At S940, a UX function triggered by the UX command is performed. Examples for such UX functions include rendering of a unified desktop's display when two or more security zones are concurrently executed in the virtualized environment. The unified desktop can display applications from different zones in different windows. In an embodiment, windows of applications from different zones are visually distinguished. The unified desktop UX function can be triggered, for example, by launching an application in another security zone.

Another example of a UX function is the transfer of content (copy-paste) across different security zones. Yet another example of a UX function is a redirection of URLs. As yet another example of a UX function is an SSO to multiple different security zones. Those functions are further discussed in detail herein.

The UX command may also refer to changing settings of the display. This would allow a user to set the display settings in one zone, and the hypervisor would apply the same settings to other zones. Examples for such preferences include a display's resolution, orientation, color, brightness, scale, and the like.

Figure 10:
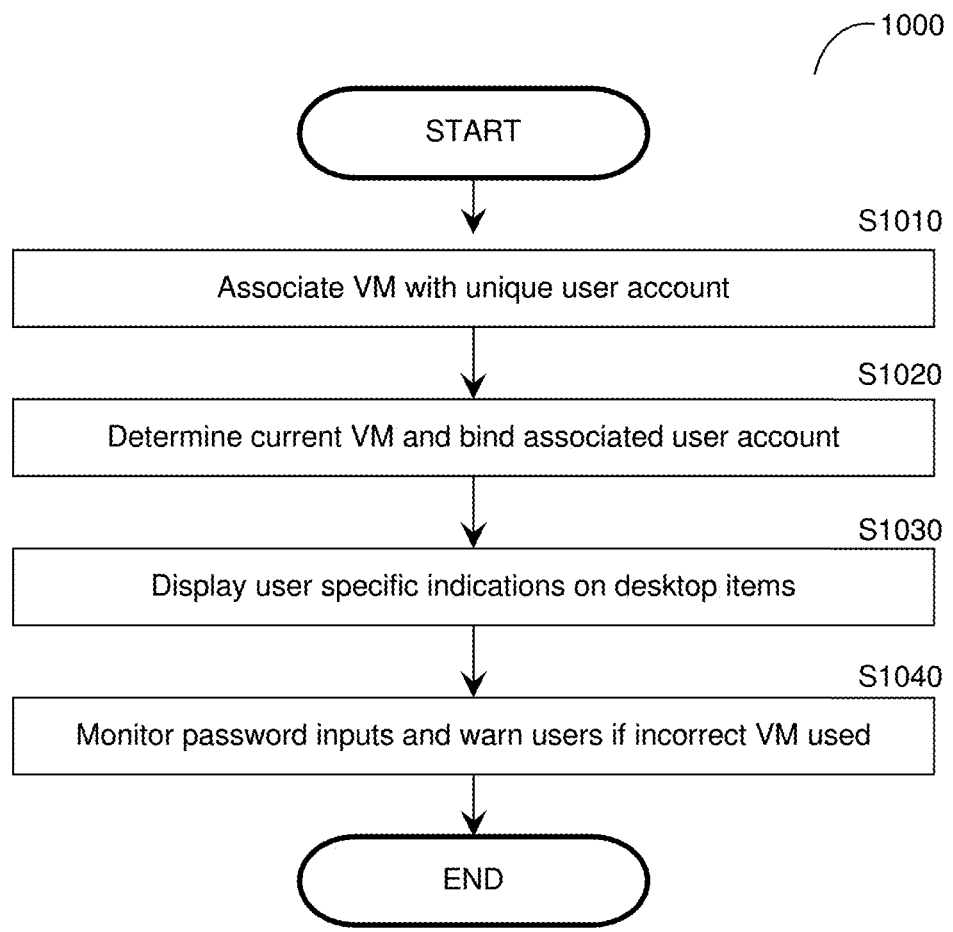
FIG. 10 is an example flowchart illustrating a method for binding a user identity to a virtual machine according to an embodiment.

FIG. 10 is an example flowchart 1000 illustrating a method for binding a user identity to a virtual machine according to an embodiment. At S1010, a plurality of virtual machines is monitored to associate user identities thereto. In an embodiment, a VM is associated with a user identity based on predetermined characteristics, such as use of a type of email server (e.g., corporate or personal), or level of access granted to a shared drive. Each VM is assigned a unique user identity or user account. A single user may possess multiple user accounts for various uses. For example, a "Personal VM" may be associated with a user's personal account having access to personal email, web browser customizations, file access, and the like, while a "Corporate VM" may be associated with a user's work account having access to a work server, work email, and the like. Each VM may be assigned one or more security zones configured to allow or deny access to certain network resources.

At S1020, a current VM is determined and the associated user identity is bound thereto. A user may be logged onto a VM used for work related tasks, and thus the current environment is determined to be a "Corporate VM." The associated user account is bound to the VM, where the user account is authenticated for permitted access on that particular VM.

At S1030, user specific indications are shown on various desktop items displayed on the VM. To help the user easily identify where each application is running, the user's identity can be prominently displayed, a relevant avatar can be shown in all relevant notification toasts, application taskbar icons, e.g., as an overlay thumbnail, tray icons and next to application window borders.

Figure 11:
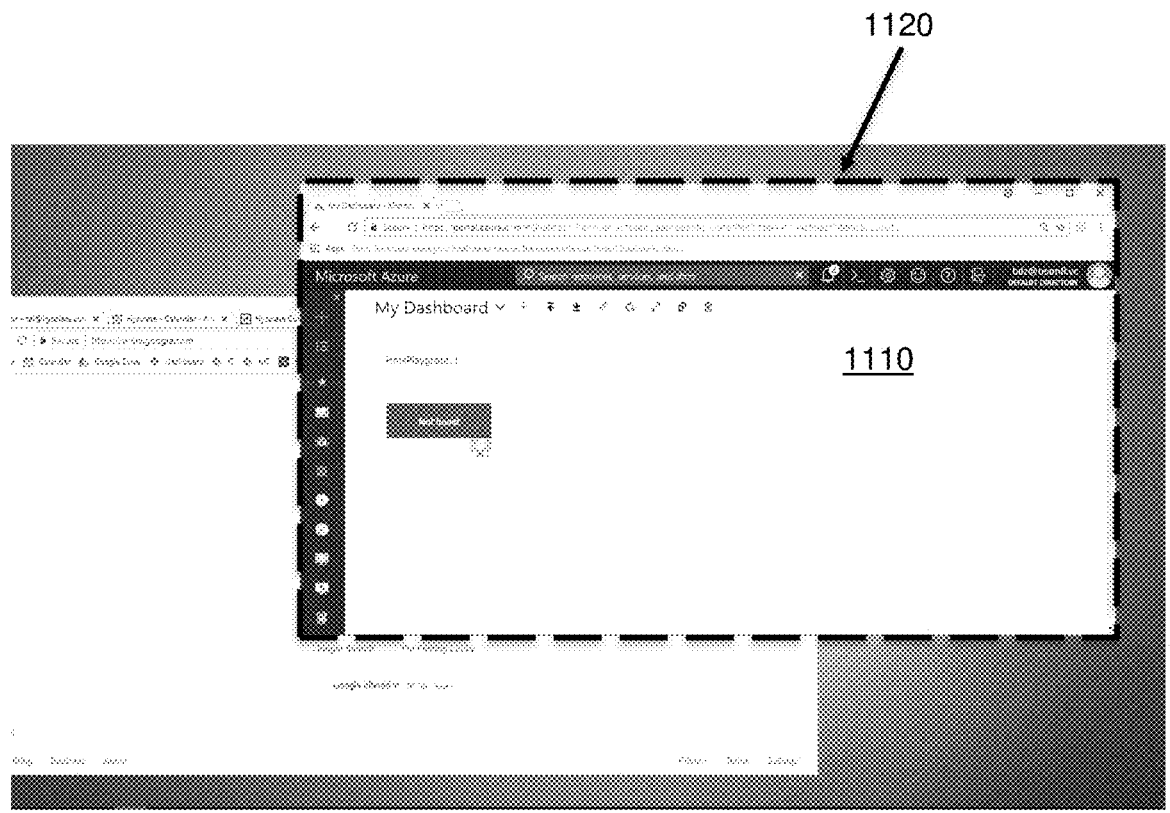
FIG. 11 shows an example screenshot of a desktop display including a window with a unique border.

Further, a uniquely colored window border can be drawn around applications tied to a specific VM. For example, as shown in FIG. 11, a unique border 1120 surrounds a window 1110, where the unique border is used to identify that window as being executed or associated with a specific VM and user account, respectively. The unique window border can be color coded (not shown) for each user account, such as applying a blue colored border around all windows or icons associated with a "Corporate VM" and a red colored border around all windows or icons associated with a "Personal VM." The borders can also have the user avatar attached thereto to further indicate the relevant identity.

It should be noted that these visual indicators, e.g., the colored windows borders, the relevant avatar, and the like, are not forgeable by malware running in a guest OS of the VM, as the hypervisor handling the VMs are configured to place these visual indicators as "topmost" graphics on top of any guest-drawn graphics. Thus, if, for example, a malware is configured to fool a user by placing the wrong border color on the wrong application, such a color will be overridden and hidden by the correct border which will always be topmost in the drawing order and will be the one border visible to the user.

At optional S1040, password inputs are monitored to ensure that a user does not mistakenly log into an account in a non-appropriate VM, e.g., a personal account from the corporate VM, or vice versa. In an embodiment, this is enforced by a network security VM that captures all network traffic and is configured to identify login attempts, either to local identity services like Active Directory or to cloud identity services. Sensitive passwords typed in the VM are prevented based on detection of unique password prefixes per environment. For example, if a user is entering input into a field labelled as a password field in a personal VM, and the first three characters match a password for a corporate account, a mismatch may be detected. Upon detection, a user is warned of a potential mistake, and any further keystrokes may be blocked until the user approves.

It should be appreciated that a VM as discussed herein is a secure zone in an air gap computer.

Figure 12:
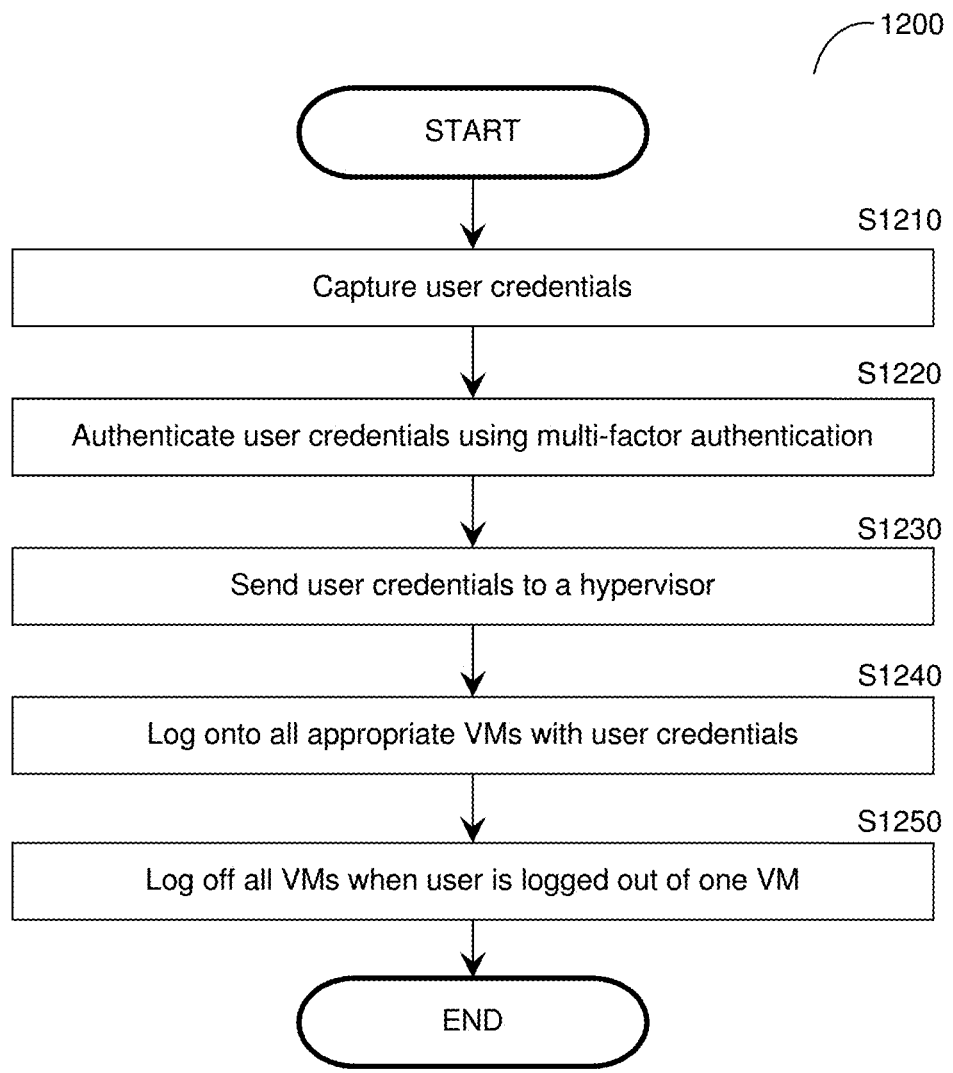
FIG. 12 is an example flowchart illustrating a method for securely signing on a user to an appropriate VM according to an embodiment.

FIG. 12 is an example flowchart 1200 illustrating a method for securely signing on a user to an appropriate VM according to an embodiment. When a user uses one user account to gain access to multiple VMs, it is often desirable to only require the user to log in once to a first VM, and based on the provided login information, to automatically log the user in to all other relevant VMs.

At S1210, user credentials that are used to log in to a first VM are captured. In an embodiment, a guest agent running on the first VM or on a host system hosting the first VM is used to capture the credentials.

At S1220, the user credentials may be authenticated using multi-factor authentication, such as two factor authentication (2FA). 2FA uses two factors of authentication to verify a user identify. In an embodiment, the first factor is an alphanumeric password entered into a password field, and the second factor is a code generated by a separate authenticator application or device. This ensures that merely entering the correct password alone is insufficient to gain access to the user account.

In an embodiment, the 2FA is completely seamless to the user, where the second factor is generated by a hypervisor. This method is faster than requiring a user to type in a 2FA code received from a second device, as the hypervisor will immediately generate and inject the second factor upon user request, e.g., upon detection of a special keystroke by the human operator. This keystroke may be configured to be non-forgeable by malware, as it is captured from the physical hardware by the hypervisor. Thus, there is no need to wait for a text message to arrive on a second user device phone or to launch a special authenticator application.

Additionally, having a hypervisor generate and enter the second factor is safer, as the second factor is often generated by smartphone, which can easily become infected as it is often a personal device without corporate restrictions and safety applications installed thereon. The hypervisor host environment is a trusted clean environment out of the reach of malware, allowing for more secure second factor generation.

At S1230, the user credentials are sent to the hypervisor, e.g., the hypervisor 140 of FIG. 1, that is configured to instantiate and control the VMs, as well as to virtualize hardware services to such VMs. Using the hypervisor instead of the VM itself ensures sensitive data, including biometric data that may be used as login info, is kept separate from guest operating systems.

At S1240, the hypervisor uses the captured credentials to log in to all appropriate VMs, e.g., VMs that are tied to the user account and determined to be necessary for certain actions, such as accessing a shared network drive or corporate email. This is known as a single sign-on feature, which allows for a single pair of credentials to be used to log into multiple systems. In an embodiment, the multiple systems may be cross-VM.

In an embodiment, the credentials are altered as necessary for each VM. A username may be based on some predetermined pattern that the administrator or the user have provided and may be adjusted accordingly. For example, a username might by DOMAIN\USERNAME (e.g., Company\John) on the corporate VM, but translated into another username like USERNAME@OTHERDOMAIN on the personal VM (e.g. john@mail.com), while both usernames have the same password. The system will automatically translate DOMAIN\USERNAME into USERNAME@OTHERDOMAIN, if the transformation was predetermined and provided by an administrator or by the user themselves.

At S1250, the user may automatically logged off all VMs that have been logged into, e.g., by the hypervisor, when logging off one VM is detected. This ensures that no VM remains logged in if one of the VMs was locked, e.g., automatically after a set period of time, or logged off by actively by the user.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for binding a user account operable on an air-gapped computer to an appropriate already executing virtual machine (VM), comprising:
    monitoring a plurality of already executing VMs, wherein the plurality of already executing VMs are executed over the air-gapped computer, and wherein each of the plurality of already executing VMs is a distinct security zone in the air-gapped computer;
    determining a VM from the plurality of already executing VMs to bind to a user account;
    capturing user credentials associated with the user account from a guest operating system (OS) executing within a primary security zone:
    logging onto the determined VM with the user credentials in a different guest OS executing within a secondary security zone, wherein the user credentials are provided by an hypervisor, wherein the hypervisor automatically provides the user credentials to all guest operating systems that have been booted within other security zones;
    binding the user account to the determined VM, thereby associating the user account with the virtual machine; and
    causing at least one user specific indication that at least identifies a bound user account to be displayed on at least one desktop item that is associated with the bound user account.

2. The method of claim 1, wherein a VM is associated with a user account based on predetermined characteristics.

3. The method of claim 2, wherein the predetermined characteristics include at least one of: use of a type of email server, access to a shared drive, and web browser customizations.

4. The method of claim 1, wherein the user specific indications include at least one of: a colored window border, a unique window border, and a relevant avatar.

5. The method of claim 1, wherein the user specific indications are displayed as topmost graphics in the VM.

6. The method of claim 1, further comprising:
    monitoring password inputs in the current VM; and
    warning a user when a password of a monitored password input is detected in a non-appropriate VM.

7. The method of claim 6, wherein the password input is detected based on detection of unique password prefixes associated with a VM.

8. The method of claim 6, further comprising:
    preventing further keystrokes until user approval is received.

9. The method of claim 1, further comprising: authenticating the user credentials using multi-factor authentication generated by the hypervisor.

10. The method of claim 1, further comprising: logging off al appropriate VMs when a singe log off from a VM is detected.

11. A non-transitory computer readabe medium having stored thereon instructions for causing a processing circuitry of an air-gapped computer having at least an appropriate executing virtual machine (VM) to perform a process, the process comprising: monitoring a plurality of already executing VMs, wherein the plurality of already executing VMs are executed over the air-gapped computer, and wherein each of the plurality of already executing VMs is a distinct security zone in the air-gapped computer;
    determining a VM from the plurality of already executing VMs to bind to a user account;
    capturing user credentials associated with the user account from a guest operating system (OS) executing within a Primary security zone;
    logging onto the determined VM with the user credentials in a different guest OS executing within a secondary security zone, wherein the user credentials are Provided by an hypervisor, wherein the hypervisor automatically provides the user credentials to all guest operating systems that have been booted within other security zones;
    binding the user account to the determined VM, thereby associating the user account with the virtual machine; and
    causing at least one user specific indication that at least identifies a bound user account to be displayed on at least one desktop item that is associated with the bound user account.

12. An air gapped computer, comprising: a processing circuitry; and a memory, the memory containing instructions that, when executed by the processing circuitry, configure the system to:
    monitor a plurality of already executing virtual machines (VMs), wherein the plurality of already executing VMs are executed over the air-gapped computer, and wherein each of the plurality of already executing VMs is a distinct security zone in the air-gapped computer
    determine a VM from the plurality of already executing VMs to bind to a user account;
    capture user credentials associated with the user account from a guest operating system (OS) executing within a Primary security zone;
    log onto the determined VM with the user credentials in a different guest OS executing within a secondary security zone, wherein the user credentials are provided by an hypervisor, wherein the hypervisor automatically provides the user credentials to all guest operating systems that have been booted within other security zones;
    bind the user account to the determined VM, thereby associating the user account with the virtual machine; and cause at least one user specific indication that at least identifies a bound user account to be displayed on at least one desktop item that is associated with the bound user account.

13. The system of claim 12, wherein a VM is associated with a user account based on predetermined characteristics.

14. The system of claim 13, wherein the predetermined characteristics include at least one of: use of a type of email server, access to a shared drive, and web browser customizations.

15. The system of claim 12, wherein the user specific indications include at least one of: a colored window border, a unique window border, and a relevant avatar.

16. The system of claim 12, wherein the user specific indications are displayed as topmost graphics in the VM.

17. The system of claim 12, where the system is further configured to:
   monitor password inputs in the current VM; and
   warn a user when a password of a monitored password input is detected in a non-appropriate VM.

18. The system of claim 17, wherein the password input is detected based on detection of unique password prefixes associated with a VM.

19. The system of claim 17, where the system 4 is further configured to:
   prevent further keystrokes until user approval is received.

20. The system of claim 12, where the system f is further configured to: authenticate the user credentials using multi-factor authentication generated by the hypervisor.

21. The system of claim 12, where the system 4 is further configured to: log off all appropriate VMs when a singe log off from a VM is detected.

* * * * *